United States Patent

[11] 3,629,100

| [72] | Inventor | Herbert N. Hersh |
| | | Skokie, Ill. |
| [21] | Appl. No. | 871,427 |
| [22] | Filed | Oct. 10, 1969 |
| [45] | Patented | Dec. 21, 1971 |
| [73] | Assignee | The United States of America as represented by the Secretary of the Army Continuation-in-part of application Ser. No. 615,025, Feb. 9, 1967, now abandoned. This application Oct. 10, 1969, Ser. No. 871,427 |

[54] OPTICAL SHUTTER COMPOSITION AND METHOD OF PRODUCING SAME
4 Claims, 1 Drawing Fig.

[52] U.S. Cl. .................................................. 252/300, 23/89, 350/2, 350/160 R
[51] Int. Cl. .................................................. F21v 9/06, G02b 5/24, G02c 7/10
[50] Field of Search .................................... 252/300; 23/89

[56] References Cited
UNITED STATES PATENTS
3,455,683 7/1969 Letter.......................... 96/1

OTHER REFERENCES
Britters et al. Physical Science Man's Conquer of Matter and Space 1950 pp. 316– 323
Schulman et al., Color Enters in Solids 1962 pages 14, 34– 36, 103, 158, 168, 185, 219, 224, 267– 268.

*Primary Examiner*—George F. Lesmes
*Assistant Examiner*—J. P. Brammer
*Attorneys*—Harry M. Saragovitz, Edward J. Kelly, Herbert Berl and Arthur L. Girard

ABSTRACT: A crystalline doped alkali halide optical shutter composition comprising a crystalline alkali halide doped with an impurity selected from the group consisting of alkali hydroxides and alkali sulfides and a method for producing same are disclosed. The presence of the alkali hydroxide and/or sulfide impurities gives rise to an increased number of ion vacancies in the crystal lattice structure of the crystalline alkali halide, thereby enhancing the tendency of the material to form color producing F-Centers when the crystalline doped alkali halide is exposed to relatively low energy radiation.

PATENTED DEC 21 1971 3,629,100
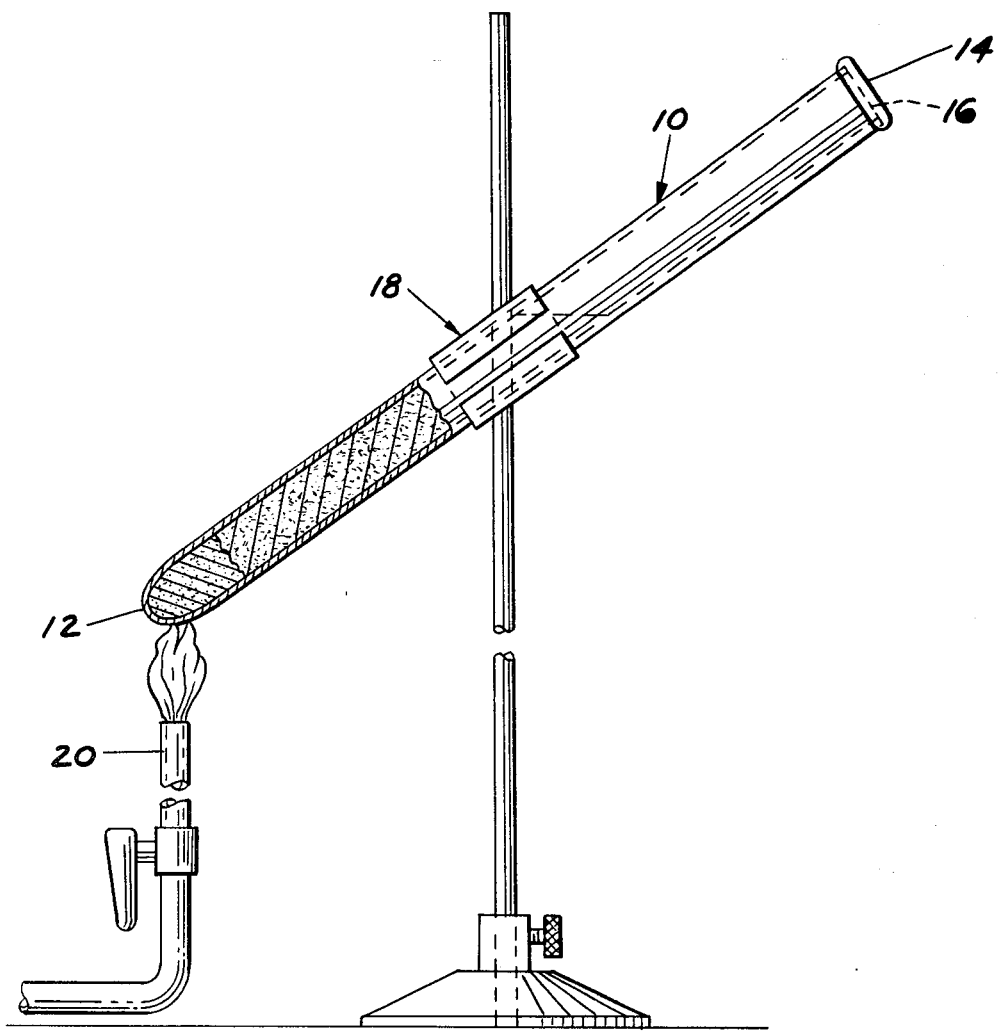

OPTICAL SHUTTER COMPOSITION AND METHOD OF PRODUCING SAME

This application is a continuation-in-part of my copending U.S. Pat. application Ser. No. 615,025 filed Feb. 9, 1967 and now abandoned.

The present invention relates to chemical compositions which demonstrate a change from transparency to opacity upon exposure to radiation and more particularly, the invention relates to monocrystalline doped alkali halide compositions, and methods of producing same.

The use of nuclear blasts as weapons in conventional or expanded warfare actions or for excavation or other peaceful uses, has posed a number of problems related to the physical protection of personnel outside of the blast or total destruction area, but within viewing distance of the blast. One such problem already encountered is retinal burn or destruction caused by nuclear blasts, commonly known as flash blindness.

Visual protection against thermal radiation emitted during nuclear blasts requires the use of a fast optical shutter through which viewing can be done under normal conditions. Such a shutter, normally open, would close in the event of a nuclear explosion within the field of view.

The minimal requirements for such an optical shutter have been estimated from studies of the thermal radiation characteristics of the fireball and of the physiological characteristics of the human eye. These requirements are as follows: the shutter should have a maximum closure time of 50 microseconds after the initiation of a nuclear blast; a maximum transmission of 0.01 percent in the spectral range is permissible in the closed condition; and for normal viewing it is desirable that the shutter system have a minimum transmission of 0.7 percent. Added to these minimal qualifications are the usual practical considerations of size, weight, dependability, and simplicity of replacement and repair which attach themselves to projected solutions of military problems of this nature.

The 50 microsecond closure time all but eliminates consideration of any mechanical shutter. A solution has therefore been sought in materials and compositions which evidence changes from transparency to opacity when exposed either to a nuclear blast or to some triggering device which is in turn initiated by the nuclear blast. Such properties have to some extent been demonstrated by the alkali halides; however these do not reduce the transmission to its greatest allowable maximum of 0.01 percent nor are their response times short enough to permit production of an optical shutter having a maximum closure time of 50 microseconds.

The present invention provides doped alkali halide compositions, which do possess the minimal characteristics set out above.

In addition, the invention replaces the previously utilized complex and thoroughly controlled zone refining methods of producing monocrystalline alkali halides, which methods required expensive and delicate equipment, with a simplified and inexpensive process which can easily be reproduced in any laboratory. Thus, the well-known Czochralski method of producing alkali halide crystals in a platinum crucible and in an inert atmosphere of argon is, according to this invention, replaced by a method comprising the application of heat to a common heat resistant glass tube sealed at one end, and mechanically closed at the other.

It is therefore an object of the present invention to provide a composition which is optically transparent under normal conditions and is rendered opaque across the visible range when exposed to proper change initiating conditions.

Another object of the present invention is the provision of a feasible simplified method for the production of the crystalline doped alkali halide compositions which supply the properties set out in the above object.

Other objects and advantages of the present invention will be made obvious to those skilled in the art by the following description when considered in relation to the lone accompanying drawing which shows an elevated view of the apparatus used for the production of the compositions of this invention according to the method thereof.

The alkali metals and the halogens form a groups of ionic compounds from which individual crystals which are transparent from the far IR to the UV can be grown. These crystals are according to the instant method easily prepared, have a simple lattice structure, and generally are well suited to optical studies.

In normal alkali halide crystals, a large variety of lattice defects are to be found. These defects arise for a number of reasons including: too rapid a crystal growth rate; the presence of impurities; mechanical shocks during and after formation; and other causes. The variety of defects extends from one simple, single isolated lattice point, to macroscopic defects affecting large numbers of ions.

When chemically pure crystals are exposed to high-energy irradiation, e.g., X-rays, the crystals take on a color which is characteristic for each alkali halide. The color has been found to be due to the absorption of an electron located at a vacant lattice site, i.e., where a negative ion should be, the electron being trapped at the negative ion vacancy. The presence of an electron in such a vacancy is called an F-Center. The source of the electron is not related to the color it now imparts to the crystal and colorization may be imparted by heating the crystal in the presence of the metal vapor or by electrolysis of the crystal at high temperature. In all cases, the source of the electron may be different but the coloration produced is the same.

In the chemically pure material it has been found possible to enhance the formation of color of F-Centers (which produce the color) by the addition of chemical impurities. Such impurities generally fall into three categories; those which enhance coloration; those which have no effect; and those which suppress the production of F-Centers. The group which suppresses F-Center formation usually does so by providing a deeper electron trap than the negative ion vacancy. Those impurities which enhance the formation of F-Centers apparently do so by increasing the defect concentration.

The introduction of certain chemical impurities into alkali halides crystals permits the use of radiation of lower energy than X-rays, e.g., ultraviolet light, and other relatively low energy radiations, for the production of F-Centers. Two such impurities have been found to be the hydroxide ion (OH$^-$) and the sulfide ion (S$^-$) which may be added to the halide individually or together to produce crystalline hydroxide and/or sulfide doped alkali halides, i.e., the alkali halide is "doped" by the addition of the sulfide or hydroxide "doping" agent or impurity; preferably, both the hydroxide and sulfide ions are added to the halide to produce both hydroxide and sulfide doped alkali halide crystals. The present interpretation for the formation of the F-Center in the case of the hydroxide ion in this system is as follows:

$$OH^- \longrightarrow O^- + H^\circ$$
$$2O^- \longrightarrow O_2^- + e^-$$
$$2H_1^\circ \longrightarrow H_2$$

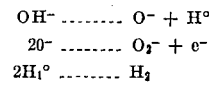

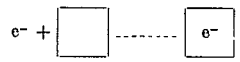

The F-Center where ☐ represents the negative ion vacancy.

These sulfur and/or hydroxide doped alkali halides have been produced according to the following described novel method. A mixture of the pure alkali halide and the same or different alkali hydroxide and/or alkali sulfide are placed in a vycor tube 10 of the drawing having one end 12 drawn to a point. Pure alkali halide is then added into the tube to achieve a from about 1:5 to about 1:7 and preferably a 1:6 ratio between the halide, hydroxide and/or sulfide mixture and the pure halide. A rubber diaphragm or other semiporous closing means 14 is then placed over the open mouth 16 of the tube clamped, by means of a clamping device 18, into position at an angle of from about 10° to about 45° with the horizontal as shown in the FIGURE of the drawing and within the immediate range of a heating means 20. The burner is lit causing the contents of the tube to melt. Once this has occurred the burner is then slowly advanced, either manually or mechanically, from pointed end 12, toward open end 16 of the tube. The rate of advance of the burner must be as near to uniform as possible at a rate of from about 7 to about 12 cm./hr. and preferably at a uniform rate of about 10 cm./hr.

transparency, opacity, and reversibility regardless of the method of cooling used to produce them and consequently their crystal size, and hence are useful for the aforementioned purposes; and likewise form the subject matter of the present invention.

The coloration properties of some of the products obtained using this method when exposed to various radiations are shown in the following chart:

| System | U-V Irradiation | X-ray Irradiation | Heat |
| --- | --- | --- | --- |
| KBr | No coloration | Slight color, blue | No effect. |
| KBr: OH | Deep color, blue | do | No effect. |
| KBr: Na$_2$S | Slight color | do | Slight coloration. |
| KBr: Na$_2$S: OH | Rapid coloration | Rapid coloration | Very dense coloration. |

Although it is preferred that the burner or other suitable heating means be moved along the horizontal below the tube or alternatively the tube be moved in its mounted position over the flame in this same fashion, it is of course possible to advance the flame or heating means parallel with the length of the tube, or in the case of certain heat mantle-type heaters about the circumference of the tube so long as the prescribed temperatures are achieved and maintained. The edge of the burner should be placed as close as possible to the closed end of the tube 12 without touching at least at the start of the heating process. Burner advance at prescribed rate causes (a) a modified zone refining procedure, (b) a thermally induced mixing, (c) single crystal growth and (d) annealing of the growing crystal, the amounts thereof all being dependent on the rate of advance of the burner or any other suitable heating means which provides local heating and rate of advance. Once heating is completed, the tube and contents are cooled at room temperature, a procedure which requires about 30 minutes; however, the crystal (or crystals as explained more fully below) can be removed at any time after the tube becomes cool enough to touch.

Heating should generally cause the contents of the tube to reach a temperature of from about 10° to about 30° above the melting temperature of the particular alkali halide being treated. In the case of KBr and KI for example, the melting points are 730° C. and 723° C. respectively and maintenance of temperatures in this range in any single zone of the tube for a period of from about 1 to about 2 hours provides the desired results.

It should be made clear that, as the angle of the reagent containing tube with the horizontal increases from about 10° to about 45° the speed of the uniform rate of advancement of the burner along the tube should decrease from about 12 to about 7 cm./hr. According to the preferred embodiment of the invention the doped alkali halides of the present invention are prepared when the tube is mounted at an angle of about 20° with the horizontal and the burner is advanced at a uniform rate of about 10 cm./hr.

Even though it is true in general that the rate of formation of a crystal determines some of the details of the physical properties of the crystal, this is not particularly true in the case of the present invention, and numerous repetitions of preparations of various doped alkali halide materials have indicated that refined and very thoroughly controlled processes are unnecessary to produce acceptable and useful crystalline structures.

With regard to the rate of cooling, which can and does affect the size of the crystals formed in the above method, it is noted that the method of preparation can result in crystals ranging from large monocrystals to small crystallites, depending upon the rate of cooling chosen by the experimenter (a rate 30 times faster than that described above achieved by permitting the tube and contents to cool at room temperature yields the aforementioned crystallites). However, since these very small transparent crystals can be pressed together to form a transparent optical plate, (which is suitable for use in the flash blindness prevention devices already described) all materials prepared by this method have the required degree of Irradiation times for the first two columns was less than 1 minute. From these results it is clear that the doping of the alkali halides with hydroxide and/or sulfide ions produces improved coloration properties in these compositions upon exposure to radiation. The doping agent is preferably present in the final doped product in parts by weight ranging from about 0.1 percent to about 5 percent.

EXAMPLE 1. A preferred embodiment of the invention disclosed herein consists of a doped alkali halide monocrystal produced according to the above described method, which crystal consists in parts by weight of 0.5% K$_2$S with 0.5% KOH and 99% KBr. This crystal was prepared by mixing 0.5 g. of K$_2$S with 0.5 g. of KOH and 14 g. of KBr and placing this mixture in a vycor tube. Subsequently, 85 g. of KBr was added, without mixing, to the mixture already in the tube, the tube and contents heated slowly and evenly using a burner advance of 10 cm./hr. and a tube angle of 20° from the horizontal until moisture condensed in the upper region of the tube, vigorously heated to from about 740°–750° until the melt glowed red, and then the tube and contents passed through a temperature gradient to room temperature in a room temperature environment.

The above compound, though not presented in the chart, shows particular promise for use in a flash blindness prevention apparatus. This compound forms F-Centers upon being irradiated with UV radiation at room temperature and also additional F-Center precursors which consist of stored energy pockets. The prime characteristics of this composition which are pertinent to the objects of this invention are as follows:

a. The F-Centers bleach thermally above room temperature, but with continued heating new and larger numbers of F-Centers are formed at higher temperature. In the excursion from room temperature to the higher temperature, the number of F-Centers passes through zero.

b. When UV irradiation is performed at this higher temperature, large numbers of F-Centers are formed directly.

c. When the F-Centers are optically bleached at room temperature, the F-Centers will still form on warmup.

In general then, there is a dramatic sensitization of the alkali halides when they are doped with hydroxide and/or sulfide ions. This property is very pronounced in NaBr as well as in KBr, and occurs in other alkali halides as well.

It is thus clear that the compositions described above are particularly suited to the aforementioned flash blindness prevention applications since they provide the required degrees of transparency and opacity and further can be repeatedly changed from the transparent to the opaque condition and back again without replacement or repair.

It is further obvious that the method described above is in no way limited to those compounds shown in the chart. The alkali ions are normally sodium and potassium and the halide ions may be of any of the halogens. These of course include the bromide, chloride and iodide ions.

The invention has been described in detail with particular reference to preferred embodiments thereof, but it will be understood that variations and modifications can be effected

I claim:

1. A method for producing a crystalline doped alkali halide comprising a crystalline alkali halide doped with an impurity selected from the group consisting of alkali hydroxide, alkali sulfide, and mixtures thereof which impurity produces an increased number of ion vacancies in the crystal lattice structure of said crystalline alkali halide, thereby enhancing the tendency of said crystalline alkali halide to form color producing F-Centers when exposed to relatively low energy radiation, said method comprising the steps of:
   a. placing a mixture comprising an alkali halide and from about 0.1 to about 5 percent by weight, based upon the total weight of the crystalline doped alkali halide to be produced, of said impurity in a tube of heat resistant and inert material, said tube having a sealed end and an open end;
   b. placing sufficient pure alkali halide into said heat resistant tube, without mixing, and over said mixture of step (a) as to provide a ratio of the mixture of step (a) to the pure alkali halide ranging from about 1:5 to about 1:7;
   c. closing said open end of said heat resistant tube and supporting said heat resistant tube at an angle of from about 10° to about 45° with the horizontal;
   d. heating said tube and its contents beginning at said sealed end thereof to a temperature of from about 10° to about 30° C. above the melting point of said alkali halide using a heating means capable of producing localized or zoned heating;
   e. advancing said heating means along the length of said tube at a rate of from about 7 to about 12 cm. per hour to provide a zone refining of the contents of said tube; and
   f. once heating along the entire length of said tube has been completed, cooling said tube and contents until it is cool to the touch.

2. The method of claim 1 wherein said alkali halide is selected from the group consisting of potassium bromide, potassium iodide, sodium bromide, and sodium iodide.

3. The method of claim 2 wherein said impurity is selected from the group consisting of potassium hydroxide, potassium sulfide, sodium hydroxide, sodium sulfide and mixtures thereof.

4. The method of claim 2 wherein: said tube consists of a heat resistant glass; the ratio of the mixture of step (a) to the amount of pure alkali halide added in step (b) is about 1:6; said heat resistant tube is supported at an angle of substantially 20° from the horizontal; said heating means is advanced along the length of said tube at a rate of substantially 10 cm. per hour; and said tube is cooled at room temperature.